3,000,769
FLUX AGENTS FOR SOFT SOLDERS

Horst Melchiors, Wesseling, Germany, assignor to Kuppers Metallwerk G.m.b.H., Bonn (Rhine), Germany, a German corporation
No Drawing. Filed May 12, 1959, Ser. No. 812,581
Claims priority, application Germany May 14, 1958
6 Claims. (Cl. 148—23)

This invention relates to soldering fluxes, and in particular to a fluxing agent efficient in joining together any metals which may ordinarily be soldered and which may be used with a large variety of solder compositions.

An ideal soldering flux should be fast and efficient as a fluxing agent on a wide variety of metals and the residue of such ideal flux after soldering should not be corrosive, electrically conductive, hygroscopic, unsightly or harmful to the operator. In actual practice it has been found impossible to obtain a flux possessing all of these properties but the present invention relates to a flux that more nearly approaches the ideal than any of the heretofore known fluxes.

Soldering fluxes at present available may be divided into two classes; namely those which are water soluble as, for example, the inorganic halide fluxes and those which are water insoluble as, for example, the rosin fluxes. The water soluble flux is generally a mineral acid such as hydrochloric acid or phosphoric acid or salts of an acid nature ionizing to form an acid upon hydrolysis. This type of flux is very active, is corrosive at ordinary temperatures, and is generally injurious to the human skin or the vapors arising therefrom are irritating or poisonous. Any residue remaining after the soldering operation has been completed must be carefully removed to prevent corrosion. Fluxes of the water insoluble type or rosin flux, however, are generally non-corrosive at ordinary temperatures so that any residue left on the metallic parts causes no damage. These fluxes are not entirely satisfactory in certain cases because the weak acids which comprise the active ingredients are not sufficiently quick-acting nor do they clean the parts to be soldered as thoroughly as do the water soluble fluxes.

The water-insoluble fluxes generally consist of a carrier component and an activating agent. As the carrier, there is employed a resin or wax, colophony being preferably used. As the activating agent there is suitable a material which, on the one hand, exerts a corrosive action on the metal surface and, on the other hand, under the heat of the soldering operation itself, the flux residue is decomposed, volatilized, carbonized, or otherwise converted into volatile material so that no unused residue may be left to corrode the metal or promote electrical leakage, harm operators, or leave an unsightly appearance. Numerous activating agents have been suggested, as, for example, hydrohalic acid salts of various organic amines. The salts of primary or secondary aliphatic amines having a low number of carbon atoms have proved unsuitable because of their strongly hygroscopic characteristics. Solder which contains the same in the flux agent as activators, decompose during the soldering operation and after the soldering there appears, very shortly thereafter, considerable damage due to corrosion of the base metal.

The higher aliphatic amines may be used as activating agents, however, in the soldering, the decomposition releasing the hydrohalic acid, proceeds only so slowly and at such high temperatures that the resin particles start to disintegrate before the same has taken place. This results in an incomplete coating and furthermore, the smell of such compounds is so disagreeable that, for this reason alone, their use is out of the question.

It has also been suggested to employ as activating agents quaternary ammonium compounds. However, the quaternary ammonium compounds are not sufficiently quick acting. Additionally, the salts of aromatic amines have been used as activators, but they are only insufficiently miscible with the colophony, start to decompose when admixed with the rosin and at the introduction of the fluxing agent into the solder and are generally disagreeable to handle. This is particularly true in the case of toluidine and aniline.

As a fluxing agent for use in the soft soldering of aluminum, cyclohexylaminehydrochloride has already been proposed (German Patent 722,451). However, when the cyclohexyl-aminehydrochloride is admixed with colophony as the carrier material, the resulting composition is unsuitable for soldering the customary base metals, such as, for example, copper, brass, lead, and zinc, since it is hygroscopic and splatters in the soldering operation. A further disadvantage of the use of cyclohexylaminehydrochloride is the very poor solubility of this salt in colophony.

The principal object of this invention is to provide a fluxing agent which is non-corrosive at ordinary temperatures and which is very active at soldering temperatures. Other objects are to provide a flux of the water insoluble type which is effective in the soldering of metals that do not readily respond to this type of flux, such as nickel, zinc, copper, iron and steel; to provide a flux which will form a non-corrosive protective coating on the soldered joint after the soldering operation has been completed; to provide a flux which is not injurious to the human skin or the vapors arising therefrom are not irritating or poisonous when taken into the human body; to provide a flux, the residue of which is not electrically conducting, thus aiding and promoting electrical leakage, and to provide a fluxing agent which is readily adaptable to convenient use in a variety of soldering processes.

In accordance with the invention, there has been discovered a new type of fluxing agent having especially desirable properties, whose activity at soldering temperatures is comparable to that of water soluble fluxes, but which is non-corrosive at ordinary temperatures either before or after the soldering operation and which has no deleterious effect on the skin.

This fluxing agent may be prepared by employing, in combination with a carrier, such as a resin or wax, as the activating agent a salt of a disubstituted cyclohexylamine.

Particularly suitable are the dilower alkyl substituted cyclohexylamines and in particular dimethylcyclohexylamine hydrochloride.

The N,N-disubstituted cyclohexylamines serving as activators in the solder materials, in accordance with the invention do not show any hygroscopic properties and do not give off any disagreeable odors in the soldering operation. They reach, at the soldering temperature of 300–360° C., the maximum of effectiveness and are equally well suited for all of the usual base metals. They are decomposed, volatilized, carbonized or otherwise converted into volatile material so that uncolored resin remains without any content of activating agent.

The flux agents, in accordance with the invention, may be utilized in all known types of solder. They may be used in connection with hollow or cored wire solder, or they may be used with the metal dust as a powder or in pastes, or they may be used in liquid form.

Thus, by proper selection of ingredients, the flux may also take the form of a lacquer-like liquid to be painted on the parts or coated on ribbon solder. Alcohol, acetone or benzol may be used as a solvent and a small amount of synthetic resin may be added to produce a tough film that can be soldered through by using a hot iron. After the solvent evaporates the flux forms a varnish-like coating. Powdered solder may be mixed with a paste flux to provide a complete soldering mixture. The novel compositions of the invention may be adapted for convenient application in any particular soldering operation by properly choosing solvents and carriers whether the soldering is done by hand or by means of a soldering machine.

Table 1 shows the results of test solderings in which solder compositions containing, as part of the fluxing agent, either dimethylcyclohexylamine hydrochloride or aniline-hydrochloride were employed.

The salts of the disubstituted cyclohexylamines are unaffected by temperature changes and may be heated even beyond 200° C., which greatly facilitates their processing and furthermore assures a uniform content of the activator in the flux agent.

TABLE 3

*Chlorine losses in dependence on time-temperature 120°*

| ° C. | Time, hrs. | N,N-Dimethyl-cyclohexyl-amine HCl, Cl-content, percent | Anilin-hydro-chloride, Cl-content, percent |
|---|---|---|---|
| 20 | 0 | 2.00 | 2.00 |
| 120 | 0.5 | 1.98 | 1.92 |
| 120 | 1.0 | 1.87 | 1.87 |
| 120 | 1.5 | 1.82 | 1.72 |
| 120 | 2.0 | 1.90 | 1.53 |
| 120 | 2.5 | 1.87 | 1.45 |
| 120 | 3.0 | 1.92 | 1.34 |
| 120 | 3.5 | 1.97 | 1.15 |
| 120 | 4.0 | 1.79 | |
| 120 | 4.5 | 2.08 | |
| 120 | 5.0 | 2.09 | |

TABLE 1

| Base Metal | Activator | Spread in mm.²—Time in Seconds | | | | | | | |
|---|---|---|---|---|---|---|---|---|---|
| | | 300° | Time | 320° | Time | 340° | Time | 360° | Time |
| Brass 63, 0.1 mm | N,N-Dimethylcyclohexyl-amine.HCl | 117.40 | 7.9 | 113.40 | 6.5 | 110.54 | 5.2 | 109.06 | 3.8 |
| | Anilinhydrochloride | 100.18 | 6.3 | 95.00 | 5.4 | 83.54 | 4.0 | 73.26 | 2.8 |
| Copper, 0.1 mm | N,N-Dimethylcyclohexyl-amine.HCl | 104.40 | 6.4 | 142.72 | 4.3 | 123.0 | 3.3 | 127.5 | 2.6 |
| | Anilinhydrochloride | 112.53 | 5.9 | 102.92 | 5.5 | 126.66 | 4.5 | 85.73 | 4.4 |
| Nickel, 0.3 mm | N,N-Dimethylcyclohexyl-amine.HCl | 81.14 | 6.6 | 112.52 | 5.6 | 98.60 | 3.9 | 96.62 | 3.9 |
| | Anilinhydrochloride | 72.66 | 7.7 | 80.93 | 6.6 | 77.06 | 5.8 | 78.20 | 5.6 |
| Zinc, 0.2 mm | N,N-Dimethylcyclohexyl-amine.HCl | 171.40 | 6.3 | 188.66 | 4.6 | 193.46 | 3.8 | 196.12 | 3.7 |
| | Anilinhydrochloride | 146.70 | 5.4 | 160.33 | 4.3 | 164.76 | 3.8 | 188.76 | 3.8 |
| Cadmium, 0.2 mm | N,N-Dimethylcyclohexyl-amine.HCl | 174.20 | 3.5 | May only be soldered up to 300° C.; beyond that it melts and the cadmium metal is oxidized | | | | | |
| | Anilinhydrochloride | 132.04 | 7.6 | | | | | | |

Test quantity: Each 200 mg. wire 60/Cu, φ 2 mm., flux agent filling weight 2 weight percent.
Soldering arrangement: Directly heated soldering bath.
Activator addition to the flux agent: A quantity equivalent to a content of 2% chlorine.

Tables 2 and 3 show the Cl-content of the activator, in accordance with the invention, after exposure to heat as compared to aniline-hydrochloride. The separation of the hydrochloric acid is a reliable gauge of the stability with changes in temperature, the same remaining stable at temperatures of up to 200° C. The separation of the corrosive chlorine ion takes place in the temperature range of from 260–300°. With the novel fluxing agents, a higher processing temperature and also a higher soldering speed is made possible.

The odor given off in the soldering operation is sweetly resinous and in no way pungent or annoying. Even under unfavorable conditions, no changes in the soldering residue take place. The protective layer formed by the residues is transparent, crystal clear, somewhat plastic and may at any time be re-melted.

TABLE 2

*Chlorine losses in heating increased at intervals*

| ° C. | Time, min. | I N,N-Dimethyl-cyclohexyl-amine.HCl, Cl-content, percent | II Anilinhydro-chloride, Cl-content, percent |
|---|---|---|---|
| 20 | 0 | 2.00 | 2.00 |
| 100 | 10 | 1.89 | 1.92 |
| 110 | 10 | 1.89 | 1.72 |
| 120 | 10 | 1.89 | 1.67 |
| 130 | 10 | 1.94 | 1.53 |
| 140 | 10 | 1.92 | 1.52 |
| 150 | 10 | 1.94 | 1.44 |
| 160 | 10 | 1.83 | 1.40 |
| 170 | 10 | 1.88 | 1.34 |
| 180 | 10 | 1.84 | 1.15 |
| 190 | 10 | 1.90 | 0.96 |
| 200 | 10 | 1.87 | 0.96 |
| Total | 110 | | |

I shows clear, dissolved and solderable, little darkening.
II sublimates strongly, darkens strongly, black streaks from 170°.

It will be seen that by means of the present invention, there have been provided novel soldering flux compositions having properties superior to those heretofore available and which may be economically and easily prepared and used. A flux prepared in accordance with the invention is quick acting at soldering temperatures and non-corrosive at ordinary temperatures.

Since a number of changes may be made in the above mentioned products and different embodiments of the invention may be made without departing from the scope of the invention, it is intended that all matters contained in the above description and specific examples should be interpreted as illustrative and not in a limited sense.

I claim:

1. In a soldering flux for soft solder having an activating agent and a carrier selected from the group consisting of resins and waxes the improvement which comprises the activating agent essentially consisting of a hydrohalide salt of an N,N-di-lower alkyl substituted cyclohexylamine.

2. The improvement according to claim 1 in which said activating agent is N,N-di-methyl-cyclohexylamine hydrochloride.

3. The improvement according to claim 1 in which said carrier is rosin.

4. A solution of a soldering flux according to claim 1 in a member selected from the group consisting of alcohol, acetone and benzene.

5. In the process for soldering metals with soft solder the improvement which comprises applying a hydrohalide salt of an N,N-di-lower alkyl substituted cyclohexylamine in order to clean the metal surface and facilitate the flow of solder thereon.

6. The improvement according to claim 5 in which said hydrohalide salt is N,N-di-methyl-cyclohexylamine hydrochloride.

References Cited in the file of this patent

UNITED STATES PATENTS 1,748,180 Lawhon _____ Feb. 25, 1930
1,949,916 McQuaid _____ Mar. 6,
2,612,459 Willard _____ Sept. 30,

OTHER REFERENCES

Hackh's Chemical Dictionary, The Blakiston Co., 214, 1944.